United States Patent [19]

Kalpathi et al.

[11] Patent Number: 5,973,462
[45] Date of Patent: *Oct. 26, 1999

[54] METHOD AND APPARATUS OF REDUCING ACOUSTIC NOISE IN SWITCHED RELUCTANCE ELECTRIC MOTOR

[75] Inventors: Ramani R. Kalpathi, Ann Arbor; Ning Liu, Ypsilanti; Scott E. Blackburn, Temperance; Sergei F. Kolomeitsev, Saline, all of Mich.

[73] Assignee: Dana Corporation, Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/050,881

[22] Filed: Mar. 30, 1998

[51] Int. Cl.$^6$ .................................................. H02K 23/00
[52] U.S. Cl. .......................................... 318/254; 318/701
[58] Field of Search ...................................... 318/254, 701

[56] References Cited

U.S. PATENT DOCUMENTS

| | | | |
|---|---|---|---|
| 4,376,261 | 3/1983 | von der Heide et al. | 318/254 |
| 4,659,969 | 4/1987 | Stupak, Jr. | 318/128 |
| 4,760,315 | 7/1988 | Nanae et al. | 318/254 |
| 4,816,725 | 3/1989 | Hudimac | 318/114 |
| 4,868,477 | 9/1989 | Anderson et al. | 318/696 |
| 4,908,536 | 3/1990 | Hudimac | 310/51 |
| 4,961,038 | 10/1990 | MacMinn | 318/696 |
| 4,982,124 | 1/1991 | Cummings et al. | 310/71 |
| 4,988,938 | 1/1991 | Ito et al. | 318/696 |
| 5,119,000 | 6/1992 | Schultz | 318/254 |
| 5,223,775 | 6/1993 | Mongeau | 318/432 |
| 5,446,359 | 8/1995 | Horst | 318/701 |
| 5,461,295 | 10/1995 | Horst | 318/701 |
| 5,569,990 | 10/1996 | Dunfield | 318/254 |
| 5,589,752 | 12/1996 | Iwasaki et al. | 318/701 |
| 5,592,058 | 1/1997 | Archer et al. | 318/254 |
| 5,627,444 | 5/1997 | Fulks | 318/701 |
| 5,689,164 | 11/1997 | Hoft et al. | 318/701 |
| 5,796,226 | 8/1998 | Ookawa et al. | 318/254 |

OTHER PUBLICATIONS

"Analysis and Reduction of Vibration and Acoustic Noise in the Switched Reluctance Drive", C.Y. Wu and C. Pollock, IEEE Transactions on Industry Applications, vol. 31 No. 1, pp. 91–98 (Jan./Feb. 1995).

Primary Examiner—Brian Sircus
Attorney, Agent, or Firm—Dykema Gossett PLLC

[57] ABSTRACT

A switched reluctance motor drive includes a noise reduction circuit configured to control the decay of current when a motor phase is switched from active to inactive. The current decay is controlled to occur in two stages: a first portion and a second portion. The first portion is controlled by alternately activating and deactivating one of the two switches in the two switch drive topology to obtain a current profile conforming to a predetermined profile. The current decay in the second portion of the inactive interval occurs by keeping both switches off so that it decays naturally. The duration of the first portion of the inactive interval is different for each motor phase, as is the duty cycle of the switch gating signal driving the switch that is alternately activated and deactivated. The scheme reduces the acoustic noise generated during operation of the motor.

15 Claims, 4 Drawing Sheets

METHOD AND APPARATUS OF REDUCING ACOUSTIC NOISE IN SWITCHED RELUCTANCE ELECTRIC MOTOR

BACKGROUND OF THE INVENTION

1. Technical Field

This invention relates generally to a system for controlling a switched reluctance (SR) motor, and more particularly, to a method and apparatus for reducing acoustic noise generated by an SR electric motor.

2. Discussion of the Related Art

Switched Reluctance Machines (SRMs) have been the subject of increased investigation due to their many advantages, which makes them suitable for use in a wide variety of situations. A SR machine operates on the basis of varying reluctance in its several magnetic circuits. In particular, such machines are generally doubly salient—that is, they have teeth or poles on both the stator and the rotor. The stator poles have windings wound therearound which form machine phases of the motor. In a common configuration, stator windings on diametrically opposite poles are connected in series to form one machine phase.

When a machine phase is energized, the closest rotor pole pair is attracted towards the stator pole pair having the energized stator winding, thus minimizing the reluctance of the magnetic path. By energizing consecutive stator windings (i.e., machine phases) in succession, in a cyclical fashion, it is possible to develop torque, and thus rotation of the rotor in either a clockwise, or counter-clockwise direction.

One problem with the operation of conventional switched reluctance motors is acoustic noise. The noise is caused by an abrupt change in current through the phase winding when the phase transitions from an active state (i.e., current being supplied from a power supply to the phase winding), to an inactive state (i.e., when residual current existing in the winding is either returned to the power supply or dissipated). The abrupt change in the current results in forces that manifests itself in acoustic noise. One approach taken in the art at reducing the acoustic noise involves a two stage decay of the residual current to lessen the abruptness in the change in current. During a first stage, which commences immediately after the phase is switched off, the residual current is decayed using a zero voltage decay technique (i.e., the current circulates through the winding, a switch, and a diode) for a duration equal to one-half the resonant time period of the motor. During the second stage, the remaining current is decayed to zero using a forced commutation technique (e.g., for a two-switch drive topology, the current circulates through both diodes and back through the power supply). A disadvantage with this approach is that in each stage, the current decays "naturally" and, further, the duration of each stage is the same for all the phases of the motor. While partially effective at reducing acoustic noise, the lack of control over the decay profile leaves substantial room for improvement in reducing acoustic noise.

Another approach taken in the art includes the "control" of the residual current from the start of the inactive part of the phase until the phase current is decayed to substantially zero. A disadvantage of this approach is that it may be required or desired to decay the current to zero more quickly than possible with a controlled approach over the entire inactive part of the phase.

Accordingly, there is a need to provide an improved system for controlling a switched reluctance machine that minimizes or eliminates one or more of the problems set forth above.

SUMMARY OF THE INVENTION

The present invention provides an improved method and apparatus for reducing acoustic noise in a switched reluctance motor (SRM). An apparatus in accordance with the invention controls a current through a winding defining a machine phase of the SRM. The machine phase includes active and inactive intervals. An apparatus according to the invention includes the following major components: a switch means, a control means for generating switch command signals, and means for controlling the current through the winding. The switch means includes first and second switches between which the winding is connected. The control means is responsive to at least one operating characteristic of the SRM, which may be an angular position of a rotor. The control means is configured to generate a first switch command signal and a second switch command signal. The means for controlling the current through the winding is connected to the first and second switches, and may preferably include a noise reduction circuit. The noise reduction circuit may be responsive to the switch command signals and be configured (i) to control the current through the winding according to a first predetermined profile during a first portion of the inactive interval and (ii) to allow the current to decay naturally during a second portion of the inactive interval following the first portion of the inactive interval.

In a preferred embodiment, the first portion of the inactive part of the phase comprises a plurality of subcycles recurring at a substantially fixed frequency. Further, also in a preferred embodiment, each subcycle comprises a first segment and a second segment, wherein during the first segment one of the first and second switches is activated and the other one of the switches is deactivated. During the second segment, both the first and second switches are deactivated. Further, the SRM may be a multi-phase SRM, wherein the duration of the first portion of the inactive interval of the first phase may be different than the duration of the first portion a second phase. Tailoring the duration of the first portion or stage of the current decay for each phase when the phase goes inactive provides a substantial degree of acoustic noise reduction. In yet another preferred embodiment, the current profiles during the respective first portions are varied by varying the duty cycle of the switch gating signal.

These and other features and objects of this invention will become apparent to one skilled in the art from the following detailed description, and the accompanying drawings illustrating features of this invention by way of example, but not by way of limitation.

DETAILED DESCRIPTION OF THE PREFERRED EMBODIMENTS

Figure 1:
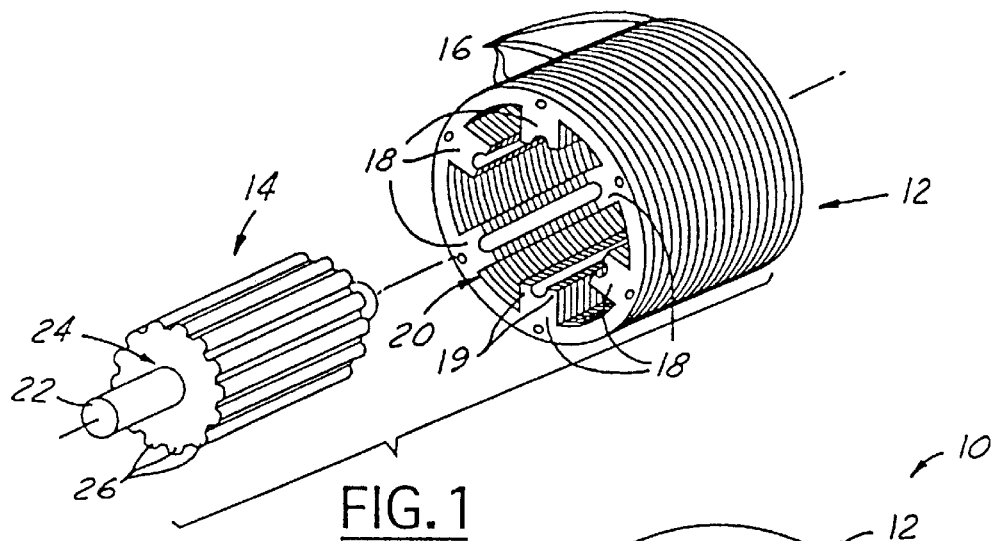
FIG. 1 is an exploded, perspective view of a portion of a switched reluctance electric motor suitable for use in connection with the preferred embodiment of the present invention.

Referring now to the drawings wherein like reference numerals are used to identify identical components in the various views, FIG. 1 shows the major mechanical components of a switched reluctance (SR) electric motor 10, which includes a stator assembly 12, and a rotor assembly 14.

Although the invention will be described and illustrated in the context of a switched reluctance electric motor 10, it will be appreciated that this invention may be used in conjunction with other well-known electric motor structures. Stator assembly 12, in a preferred embodiment, comprises a plurality of laminations 16. The laminations are formed using a magnetically permeable material, such as iron.

Stator 12 is generally hollow and cylindrical in shape. A plurality of radially, inwardly extending poles 18 are formed on stator 12 (via laminations 16) and extend throughout the length thereof. Poles 18 are preferably provided in diametrically opposed pairs. In the illustrative embodiment, each of the six poles 18 includes a respective pair of teeth 19 for a total of 12 teeth. It should be appreciated, however, that a greater or lesser number of poles 18 may be provided in particular configuration.

Each of the poles 18 may have a generally rectangular shape, when taken in cross-section. The radially innermost surfaces of the poles 18 are slightly curved so as to define an inner diameter representing bore 20. Bore 20 is adapted in size to receive rotor assembly 14.

Rotor assembly 14, when assembled into stator 12 (best shown in FIG. 2) is coaxially supported within stator 12 for relative rotational movement by conventional means. For purposes of description only, and not limitation, rotor assembly 14 may be supported by conventional bearings (not illustrated) mounted in conventional end bells (not shown) secured to the longitudinal ends of the stator assembly 12. Rotor assembly 14 includes a generally cylindrical shaft 22, and rotor 24. Shaft 22 may be hollow, although illustrated in FIG. 1 as being solid. Rotor 24 is secured to shaft 22 for rotation therewith. For example, rotor 24 may be secured to shaft 22 by means of a spline (not shown), or other conventional means well-known in the art. Thus, it should be appreciated that shaft 22, and rotor 24 rotate together as a unit.

Rotor 24 includes the plurality of poles 26 formed on an outer surface thereof. Each pole 26 extends radially outwardly from the outer surface thereof and is formed having a generally rectangular shape, when taken in cross-section. Rotor poles 26 extend longitudinally throughout the entire length of the outer surface of rotor 24. The radially outermost surfaces of rotor poles 26 are curved so as to define an outer diameter, adapted in size to be received within the inner diameter defining bore 20. That is, the outer diameter formed by poles 26 is slightly smaller than the inner diameter defined the radially innermost curved surfaces of stator poles 18. Rotor poles 26 may also be provided in diametrically opposed pairs. Fourteen (14) rotor poles 26 are provided on the illustrated rotor assembly 14; however, it should be appreciated that a greater or lesser number of rotor poles 26 may be provided. For SR motors, in general, the number of rotor poles 26 differs from the number of stator poles 18, as is well-known. Rotor 24, including poles 26, may be formed from a magnetically permeable material, such as iron.

Figure 2:
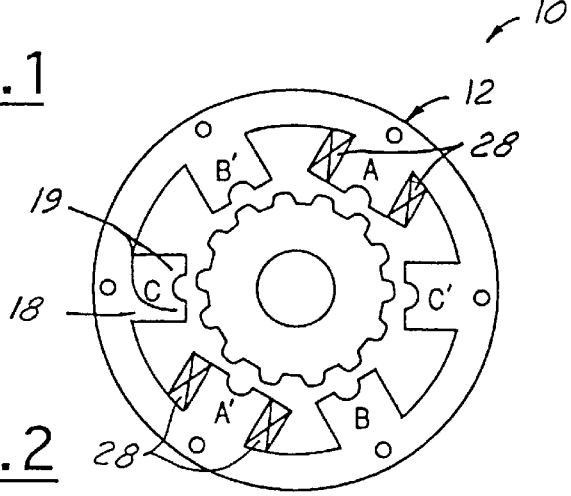
FIG. 2 is a diagrammatic, exaggerated, cross-sectional view of a switched reluctance electric motor illustrating the relative positions of a stator, and rotor portion thereof.

Referring now to FIG. 2, a diagrammatic view of cross-section of an assembled motor 10 is illustrated. In particular, as referred to above, poles 18 occur in pairs: i.e., A A', B B', and C C'. The rotor poles 26 also appear in pairs. Stator windings 28 (shown only on stator pole pair A A' for clarity) of diametrically opposite poles (e.g., A A') associated with stator 12 are connected in series to form one machine phase. Thus, the windings 28 on poles A A' are referred to as "machine phase A" of SR motor 10.

In the illustrated example, SR motor 10 also has a machine phase B, and a machine phase C. Each of these three machine phases may be energized individually, which, when done in a controlled manner, provides for rotation of rotor 24. Although a three-phase machine is described and illustrated, a machine having any number of phases is contemplated as falling within the spirit and scope of the present invention.

Figure 3:
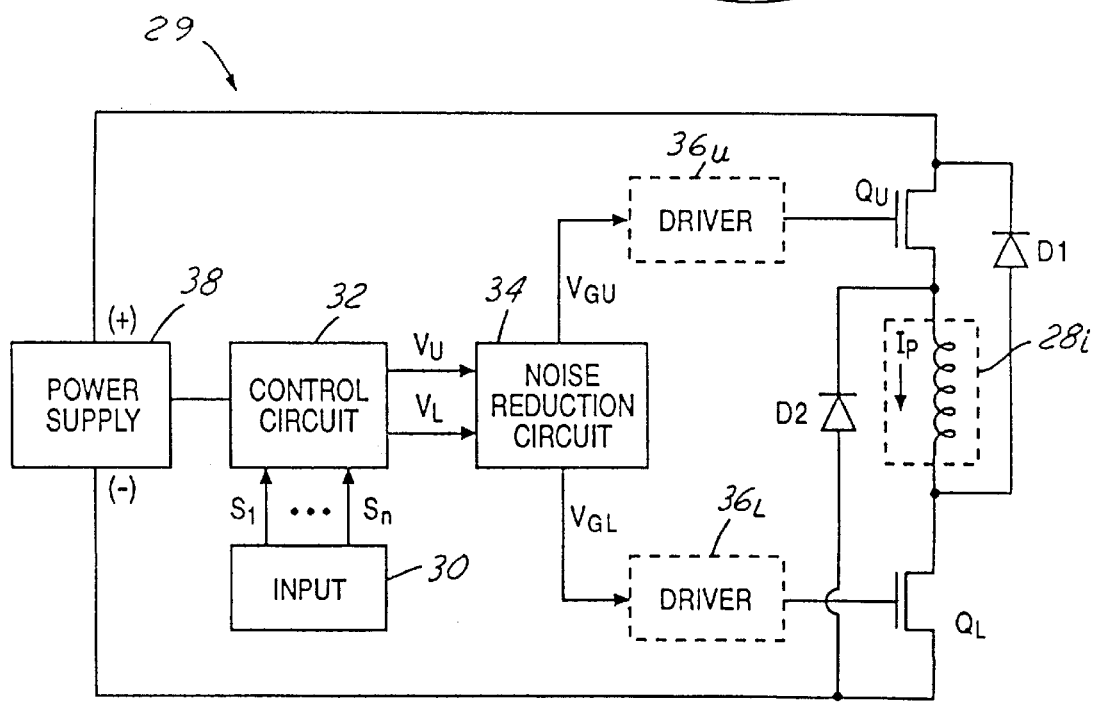
FIG. 3 is a simplified, block and schematic diagram view showing a preferred embodiment of a motor control system according to the present invention.

Referring now to FIG. 3, a preferred environment in which the method according to the present invention may be employed is illustrated. FIG. 3 illustrates an apparatus (29) for controlling a current through a winding defining a machine phase of a switched reluctance machine. The machine phase includes active and inactive intervals. Although shown for one machine phase, several apparatuses 29 may be used, one for each phase, for a multi-phase SRM 10. The apparatus 29 comprises switch means including a first (or upper) switch $Q_u$ and a second (or lower) switch $Q_L$, input means 30, means, such as control circuit 32, for generating a first switch command signal $V_u$ and a second switch command signal $V_L$, means, such as noise reduction circuit 34 for controlling the current through the winding when the phase is inactive, gate driver circuits $36_U$ and $36_L$, a power supply 38, a first diode D1, and a second diode D2.

The circuitry shown in FIG. 3 includes a well-known two-switch per phase energization or drive topology. Switches $Q_U$ and $Q_L$ may comprise semiconductor devices selected from the group consisting of either field effect transistors (FET) or insulated gate bipolar transistors (IGBT). As illustrated, the winding of the ith phase of SRM 10, namely $28_i$, is connected between switches $Q_U$ and $Q_L$. The current through winding $28_i$ is designated $I_P$.

Input block 30 is provided for sensing or otherwise determining one or more operating characteristics or parameters of switched reluctance motor 10, and generating in response thereto one or more operating characteristic signals $S_1, \ldots S_n$. Such operating characteristics may include an angular position parameter of rotor 14 relative to stator 12, an angular speed parameter of rotor 14 relative to stator 12, the magnitude of the phase current through winding $28_i$, as well as other operating characteristics well-known to those of ordinary skill in the art. Input block 30 may comprise conventional and well-known sensing circuitry and/or devices.

Control circuit 32 is responsive to at least one of the operating characteristic signals $S_1, \ldots, S_n$ for generating switch command signals $V_U$ and $V_L$. Control circuit 32 may comprise conventional and well-known circuitry and/or devices for generating switch command signals $V_U$ and $V_L$ (i.e., also sometimes known as phase commutation signals). In a preferred embodiment, control circuit 32 includes a microcontroller configured to generate signals $V_U$ and $V_L$ in accordance with a predetermined, preprogrammed operating strategy. The art is replete with various operating strategies for generating the switch command signals. The method and apparatus in accordance with the present invention is independent of the operating strategy selected in any particular instance.

Noise reduction circuit 34 is responsive to signals $V_U$ and $V_L$ and is coupled by way of drivers 36 to switches $Q_U$ and $Q_L$. Circuit 34 is configured to generate first and second switch gating signals $V_{GU}$ and $V_{GL}$ to control switches $Q_U$ and $Q_L$ such that the current through the winding during a first portion of the inactive interval of the phase conforms to a first predetermined profile. The profile is selected based on the mechanical and electrical characteristics of the motor to reduce acoustic noise. For example, application Ser. No. 08/690,172, now allowed, entitled "Method and Apparatus for Reducing Noise in a Variable Reluctance Motor", filed Jul. 26, 1996, commonly owned by the assignee of the present invention, hereby incorporated by reference, describes a technique for determining a suitable duration for a natural decay stage.

Figure 6A:
FIGS. 6A–6C are simplified, timing diagram views illustrating how the switch gating signals generated in accordance with the present invention control the current during an inactive interval of the phase.
Figure 6B:
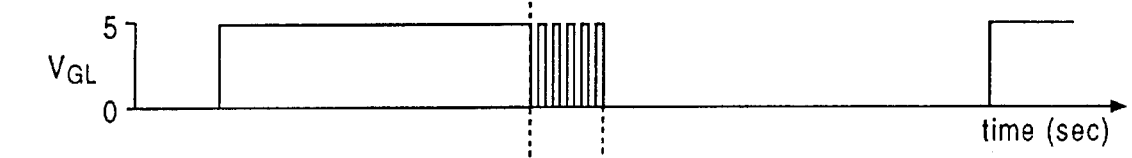
Figure 6C:
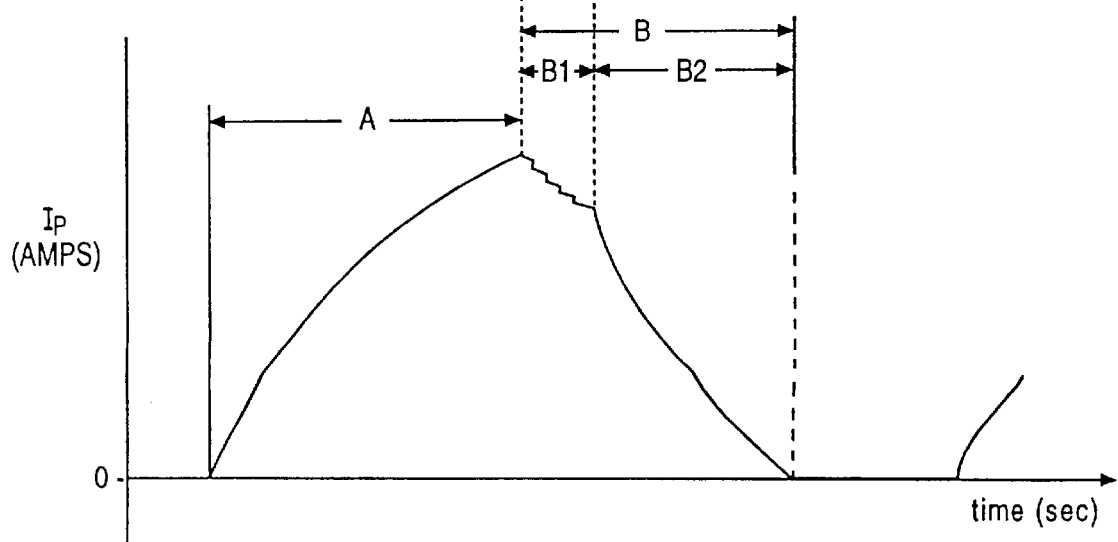
Figure 7:
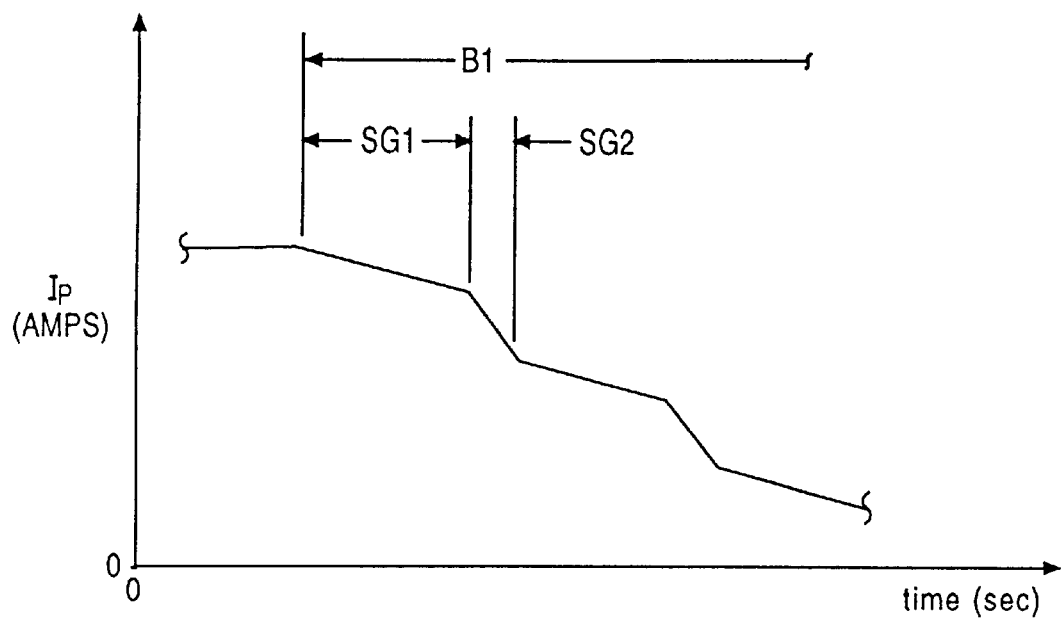
FIG. 7 is an enlarged, phase current-versus-time graph of the current profile generated during a first portion of the inactive phase, as shown in FIG. 6C.

Noise reduction circuit 34 is further configured to allow the current through the winding to decay naturally during a second portion of the inactive phase that immediately follows the first portion of the inactive phase (this is best illustrated in FIGS. 6C, and 7). In this application, the terms "decay naturally" and/or "naturally decay" mean the reduction in residual phase current due to a drive configuration where (i) both switches $Q_U$ and $Q_L$ are "off" when the phase is inactive so that residual current follows a path through winding $28_i$, diode D1, the power supply, the ground rail, diode D2, and back to winding $28_i$; or (ii) only one of switches $Q_U$ or $Q_L$ is "on" or activated, while the other one of the switches is not activated when the phase is inactive so that the residual current circulates through the winding $28_i$, diode D1, and $Q_U$, or, winding $28_i$, $Q_L$, and diode D2, respectively. Moreover, the terms "decay naturally" and/or "naturally decay" mean that only one of the above-identified configurations is selected for the interval of interest. As will be described in further detail hereinafter, controlling the residual current over a predetermined interval which involves alternating between the two above-identified configurations may be used to obtain a desired decay slope (e.g., the first predetermined current profile). In a preferred embodiment, the term "decay naturally" and/or "naturally decay" means a reduction in current from a configuration where switches $Q_U$ and $Q_L$ are both deactivated or "off".

Drivers $36_U$ and $36_L$ may optionally be included in apparatus 29 when required to drive switches $Q_U$ and $Q_L$. When included, drivers $36_U$ and $36_L$ may comprise conventional and well-known circuitry.

Power supply 38 is provided to impress a predetermined voltage across phase winding $28_i$ when switches $Q_U$ and $Q_L$ are on, and further, to supply current therefrom. Power supply 38 may comprise conventional and well-known circuitry and/or devices familiar to those of ordinary skill in the art.

Figure 4:
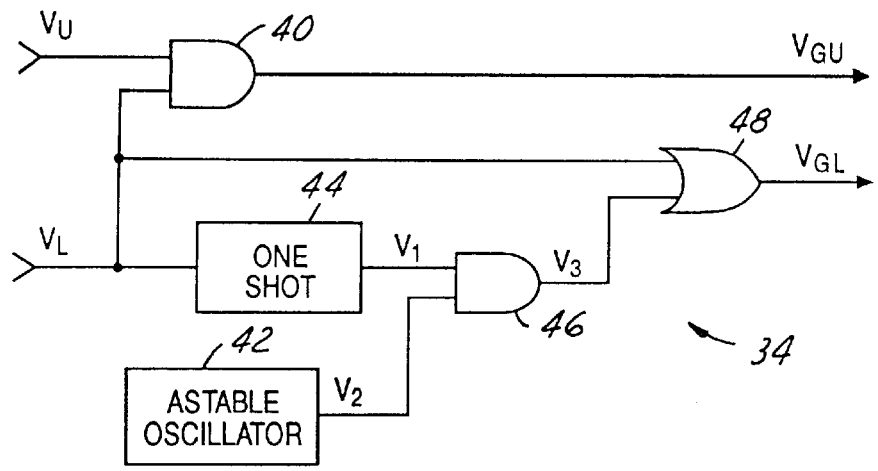
FIG. 4 is a simplified schematic and block diagram view showing in greater detail the noise reduction circuit shown in FIG. 3.

FIG. 4 illustrates in greater detail the noise reduction circuit 34 shown in FIG. 3. Circuit 34 may include a first AND gate 40, an oscillator 42, a one-shot circuit 44, a second AND gate 46, and a first OR gate 48.

First AND gate 40 is configured to generate the first switch gating signal $V_{GU}$ in response to the first and second switch command signals $V_U$ and $V_L$. Gate 40 is conventional.

Oscillator 42 may comprise a stable oscillator constructed from conventional circuitry and/or devices well-known to those of ordinary skill in the art. Oscillator 42 is configured to generate a first periodic signal $V_2$ having a frequency and duty cycle as described below. Oscillator 42 may comprise conventional circuitry.

One-shot circuit 44 is sometimes referred to as a monostable multivibrator (i.e., one stable state, one unstable state). One-shot 44 is configured to generate a pulse signal $V_1$ in response to the second switch command signal $V_L$. In a preferred embodiment, the duration of the pulse generated by one-shot 44 is substantially equal to the duration of the first portion of the inactive interval of the phase (i.e., corresponding to intervals B1, and B1' shown in FIGS. 6C, and 7). One-shot 44 is conventional.

AND gate 46 is configured to generate a second periodic signal $V_3$ corresponding to the first periodic signal $V_2$ for the duration of the pulse part pulse signal $V_1$. AND gate 46 is conventional.

Figure 5A:
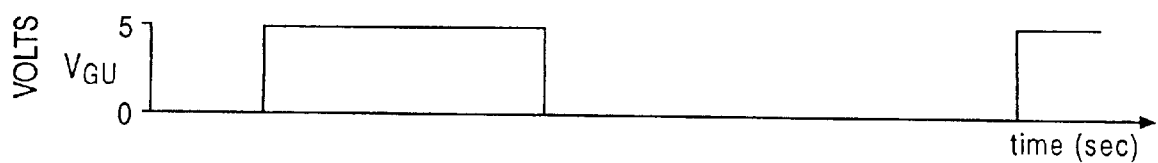
FIGS. 5A–5G are simplified, voltage-versus-time graphs of signals generated at various nodes in the noise reduction circuit shown in FIG. 4.
Figure 5B:
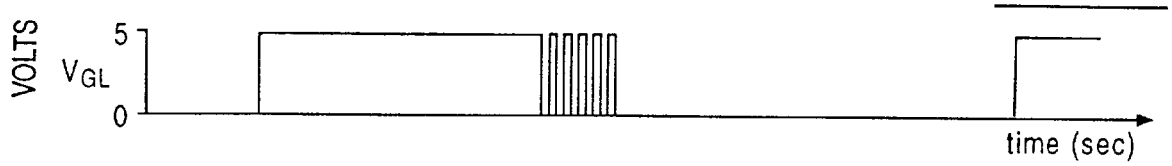
Figure 5C:
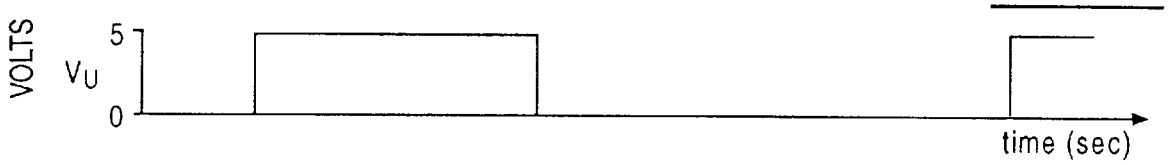
Figure 5D:
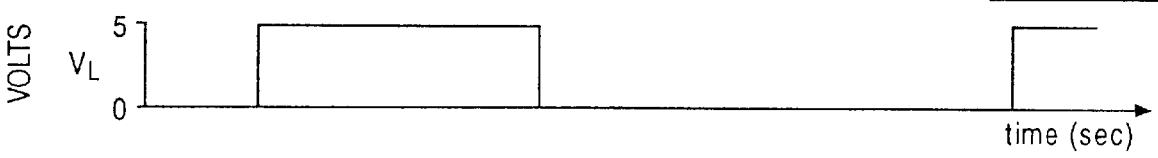

FIGS. 5A–5G show voltage waveforms at various nodes in circuit 34 of FIG. 4. FIGS. 5C and 5D illustrate exemplary switch command signals $V_U$ and $V_L$ generated by control circuit 32 in accordance with a predetermined operating strategy.

Figure 5E:
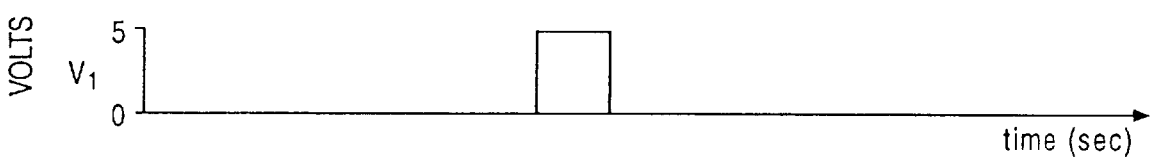
Figure 5F:
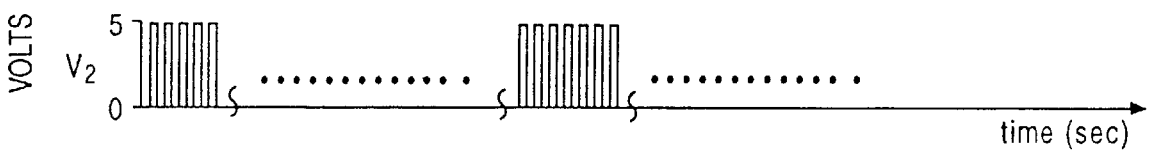

FIG. 5F shows the output of oscillator 42, which may be free-running in a preferred embodiment (i.e., not triggered by another signal in order to enable its output).

FIG. 5E shows the output of one-shot circuit 44, which is triggered by the falling edge of switch command signal $V_L$.

Figure 5G:
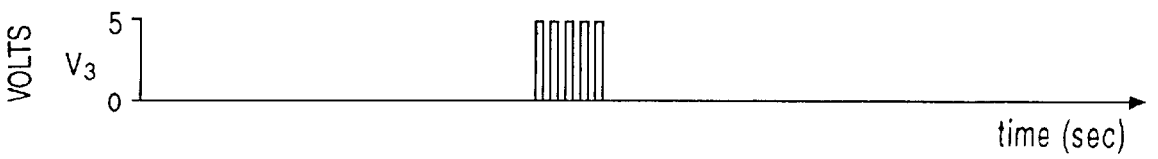

FIG. 5G shows the output of AND gate 46. The pulse signal $V_1$, in-effect, enables gate 46 to pass a portion of the periodic signal (generated by oscillator 42) on its other input, namely, $V_2$ to its output.

FIGS. 5A and 5B show the first and second switch gating signals $V_{GU}$ and $V_{GL}$. Note that the circuit of FIG. 4, as shown in FIG. 5B, effectively delays the final turnoff of lower switch $Q_L$.

Referring now to FIGS. 6A–6C, the apparatus and method in accordance with the present invention establishes a two-portion (or two stage) decay of the residual current after the phase has been turned off. FIGS. 6A and 6B reproduce the timing diagrams shown in FIGS. 5A and 5B for purposes of relating the intervals to FIG. 6C. Referring specifically now to FIG. 6C, the interval designated A refers to the active interval of the phase wherein control circuit 32 and noise reduction circuit 34 are configured to control the switches $Q_U$ and $Q_L$ so that current is drawn from power supply 38 (at least during portions thereof). The inactive interval of the phase is designated generally at B and includes a first portion B1 and a second portion B2. In a preferred embodiment, the phase current $I_p$ is decayed to a substantially zero value during the second portion B2.

FIG. 7 shows first portion B1 in greater detail. First portion B1, in a preferred embodiment, comprises a plurality of subcycles (each comprising a first segment SG1, and a second segment SG2). Each subcycle recurs at a substantially constant frequency. Thus, the period (T) of each subcycle is the addition of the durations of segments SG1 and SG2. Noise reduction circuit 34 is configured to activate one of switches $Q_U$ and $Q_L$ and deactivate the other one of the switches $Q_U$ and $Q_L$ during the first segment SG1. This configuration provides a recirculating path for the residual current, which decays through dissipation of energy in the components of the recirculating path (e.g., winding $28_i$, D1, $Q_U$, or, $28_i$, $Q_L$, and D2). Noise reduction circuit 34 is further configured to deactivate both of the switches $Q_U$ and $Q_L$ during the second segment SG2. This is a so-called forced decay approach inasmuch as the residual current must travel through winding $28_i$, D1, power supply 38, ground rail, and diode D2, in opposition to the voltage potential generated by power supply 38. This explains the much steeper decay slope for segment SG2. In a preferred embodiment, the duration of the subcycle (e.g., SG1+SG2) is the same throughout first portion B1 (i.e., it repeats). The duty cycle of $V_{GL}$, namely, $$\left(\frac{\text{duration}(SG1)}{\text{duration}(SG1) + \text{duration}(SG2)}\right)$$

is also preferably constant throughout first portion B1. Therefore, the duty cycle (as defined above for $V_{GL}$) of the current signal $I_p$ is also constant for first portion B1.

Figure 8:
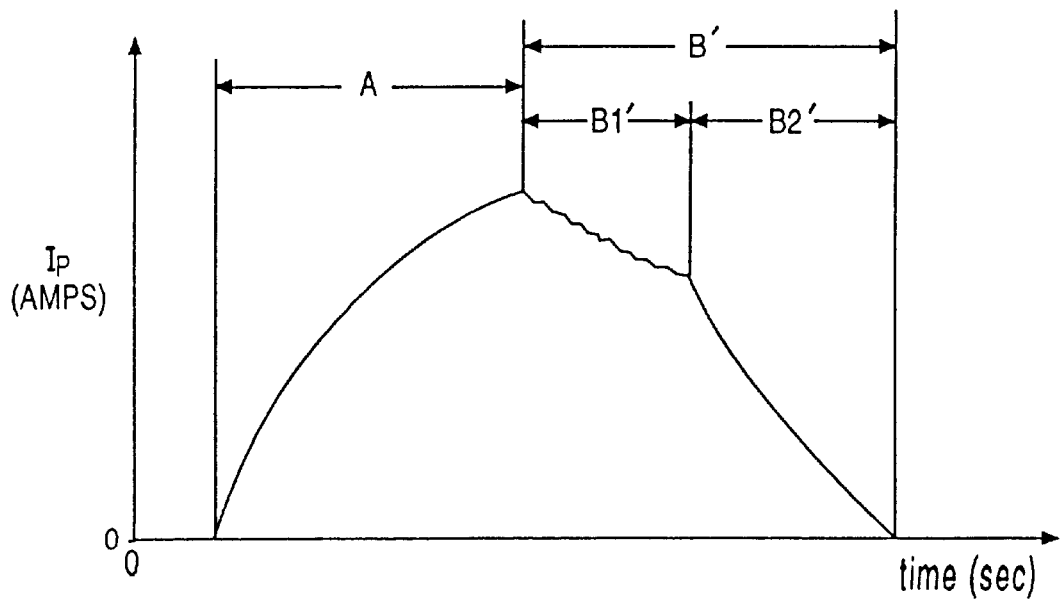
FIG. 8 shows a simplified, phase current-versus-time graph of the phase current through a second phase winding different from the phase winding current shown in FIG. 6C.

In another aspect of the present invention, in one embodiment, the duration of the first portion B1 is varied for each motor phase. FIG. 8 shows a phase current profile for a motor phase different from the motor phase whose current profile is shown in FIG. 6C. For example, FIG. 6C may correspond to motor phase A, while FIG. 8 may correspond to motor phase B. In FIG. 8, the active interval of the phase is designated A. The inactive interval of the phase is designated B'. The inactive interval comprises two portions: a first portion B1' and a second portion B2'. In accordance with yet another aspect of the present invention, in one embodiment, the duration of first portion B1, corresponding to the controlled decay of current through a first winding, for example, phase A, may be different than the duration of first portion B1 through a second winding corresponding to a different motor phase, for example, phase B. More preferably, in one embodiment, the duration of first portion B1 (and B1', B1", etc.) for each of the motor phases may be different, and most preferably, such duration may (but not necessarily in every embodiment) increase between consecutive phases (e.g., for a three phase motor, Phase A–Phase B–Phase C=$T_A$<$T_B$<$T_C$).

In yet another aspect of the present invention, the duty cycle (as defined above) of signal $V_{GL}$ corresponding to first portion B1 is varied for each motor phase of a multi-phase SRM. In another preferred embodiment, the duty cycle may decrease (but not necessarily) between consecutively energized phases (e.g., phase A–phase B–phase C=$DC_A$>$DC_B$>$DC_C$). The values for the frequency of the subcycles (e.g., the period consisting of SG1 and SG2), the duty cycle (as described above), and the duration of first portion B1, may vary from motor configuration to motor configuration. As indicated above, the precise values may depend on the electrical, and mechanical configuration of the motor, and may be determined through a reiterative process (to determine what values provide improved noise reduction). Further, it should be appreciated that different mechanical/electrical motor configurations may call for different durations/duty cycles, especially on a per-phase basis, than described above for one embodiment, in order to reduce acoustic noise (or to reduce acoustic noise to desired or required levels). However, once established for any particular motor drive application, such values will be fixed for the operation of the motor drive.

EXAMPLE

For a switched reluctance motor with a three-phase, twelve (12) stator tooth fourteen (14) rotor pole topology, operating at a nominal speed of 2500 rpm, and having a nominal output of 600 watts, parameters set forth below in Table 1 were found to minimize acoustic noise.

TABLE 1

| Phase | Frequency (kHz) | Duty cycle (%) | Duration (usec) |
|-------|-----------------|----------------|-----------------|
| A | 50 | 40 | 50 |
| B | 50 | 30 | 100 |
| C | 50 | 20 | 150 |

A method of operating a switched reluctance motor in accordance with the present invention involves three basic steps. The first step involves conducting a current, drawn from a power supply, through the phase winding during an active interval of the motor. Second, reducing the current through the winding according to a first predetermined profile during a first portion of an inactive interval of the phase that immediately follows the active interval. Finally, the last step involves decaying the current remaining in the winding naturally during a second portion of the inactive interval immediately following the first portion.

In sum, the invention relates to a method and apparatus for controlling the current in the phase coils of a switched reluctance motor to ensure a smooth transition of current in the phase coil that has just been turned off. Smoothing the transition of the current between the active and inactive intervals of the phase reduces acoustic noise generated by vibrations and other undesirable mechanical manifestations arising from abrupt electrical current transitions. One advantage of this approach over conventional approaches is that it combines a tailored current profile (first portion of decay) for smoothing the abruptness of current change, with a forced decay, to more quickly removal current from the coil. This combination is especially desirable where total decay time (i.e., inactive interval) is limited, but effective noise reduction is nonetheless desired.

The preceding description is exemplary rather than limiting in nature. A preferred embodiment of this invention has been disclosed to enable one skill in the art to practice the invention. Variations and modifications are possible without departing from the spirit and scope of this invention; the scope of which is limited only by the appended claims.

We claim:

1. An apparatus for controlling a current through a winding defining a machine phase of a switched reluctance machine (SRM) wherein said phase includes active and inactive intervals, said apparatus comprising:

switch means including first and second switches between which said winding is connected;

control means responsive to at least one operating characteristic signal for generating a first switch command signal and a second switch command signal;

means responsive to said first and second switch command signals and coupled to said switch means for controlling said current through said winding according to a first predetermined profile during a first portion of the inactive interval and to allow said current to decay naturally during a second portion of the inactive interval following said first portion.

2. The apparatus of claim 1 wherein said first and second switches comprise semiconductor devices selected from the group consisting of field effect transistors (FET) and insulated gate bipolar transistors (IGBT).

3. The apparatus of claim 1 wherein said operating characteristic includes an angular position parameter of a rotor portion of said SRM relative to a stator portion of said SRM and said control means includes a microcontroller configured to generate said first and second switch command signal in accordance with a predetermined operating strategy.

4. The apparatus of claim 1 wherein said current is decayed to substantially zero during said second portion.

5. The apparatus of claim 1 wherein said means for controlling said current is further configured to control said switch means such that current is drawn from a power supply during at least a portion of the active interval.

6. The apparatus of claim 1 wherein said second portion immediately follows said first portion.

7. The apparatus of claim 6 wherein said first portion comprises a plurality of subcycles recurring at a substantially constant frequency.

8. The apparatus of claim 7 wherein each subcycle comprises a first segment and a second segment;

wherein said means for controlling said current is configured, during said first segment, to activate one of said first and second switches and deactivate the other one of said first and second switches; and, wherein said means for controlling said current is further configured to deactivate said first and second switches during said second segment.

9. The apparatus of claim 8 wherein said winding is a first winding and said phase is a first phase, said SRM comprising a second winding defining a second phase, said means for controlling said current being configured to control said switch means so that said first portion of said first phase has a first duration and a first portion of an inactive interval of said second phase has a second duration;

wherein said first duration is different than said second duration.

10. The apparatus of claim 9 wherein the ratio between a duration of said first segment to a first sum of the durations of said first segment and said second segment for said first phase defines a first duty cycle, the ratio between a duration of said first segment to a second sum of the durations of said first segment and said second segment for said second phase defines a second duty cycle;

wherein said first duty cycle is different than said second duty cycle.

11. The apparatus of claim 1 wherein said means for controlling said current includes:

a noise reduction circuit configured to generate first and second switch gating signals in response to said first and second switch command signals.

12. The apparatus of claim 11 wherein said noise reduction circuit includes:

a first AND gate configured to generate said first switch gating signal in response to said first and second switch command signals;

an oscillator configured to generate a first periodic signal;

a one-shot circuit configured to generate a pulse signal in response to said second switch command signal, said pulse signal having a duration substantially equal to a duration of said first portion of said inactive interval;

a second AND gate configured to generate a second periodic signal corresponding to said first periodic signal for the duration of said pulse signal; and, a first OR gate configured to generate said second switch gating signal in response to said second periodic signal and said second switch command signal.

13. An apparatus for controlling a current through a winding defining a machine phase of a switched reluctance machine (SRM) wherein said phase includes active and inactive intervals, said apparatus comprising:

a first switch and a second switch between which said winding is connected;

a control circuit configured to generate a first switch command signal and a second switch command signal in response to at least one SRM operating characteristic;

a noise reduction circuit configured to generate a first switch gating signal and a second switch gating signal in response to said first and second switch command signals, said first and second switch gating signals being applied to said first and second switches for controlling said current through said winding according to a first predetermined profile during a first portion of the inactive interval and to allow said current to decay naturally during a second portion of the inactive interval following said first portion.

14. The apparatus of claim 13 wherein said first portion comprises a plurality of subcycles recurring at a substantially constant frequency, each subcycle comprising a first segment and a second segment;

wherein said noise reduction circuit is configured to activate one of said first and second switches and deactivate the other one of said first and second switches during said first segment; and, wherein said noise reduction circuit is further configured to deactivate said first and second switches during said second segment.

15. A method of operating a switched reluctance motor (SRM) that includes a winding defining a motor phase having active and inactive intervals, said method comprising the steps of:

(A) conducting a current drawn from a power supply through the winding during the active interval;

(B) reducing the current through the winding according to a first predetermined profile during a first portion of the inactive interval immediately following the active interval; and, (C) decaying the current through the winding naturally during a second portion of the inactive interval of the phase immediately following the first portion.

* * * * *